D. M. WINANS.

PHONOGRAPH STOP DEVICE.

APPLICATION FILED JAN. 19, 1916.

Reissued Aug. 19, 1919.

14,718.

INVENTOR

Daniel M. Winans.

WITNESS

A. J. Hartman.

BY Fenton & Shurtz

ATTORNEYS

UNITED STATES PATENT OFFICE.

DANIEL M. WINANS, OF BINGHAMTON, NEW YORK, ASSIGNOR, BY DIRECT AND MESNE ASSIGNMENTS, TO VICTOR TALKING MACHINE COMPANY, OF CAMDEN, NEW JERSEY, A CORPORATION OF NEW JERSEY.

PHONOGRAPH-STOP DEVICE.

14,718. Specification of Reissued Letters Patent. Reissued Aug. 19, 1919.

Original No. 1,084,993, dated January 20, 1914, Serial No. 688,129, filed April 3, 1912. Application for reissue filed January 19, 1916. Serial No. 73,055.

*To all whom it may concern:*

Be it known that I, DANIEL M. WINANS, a citizen of the United States, and resident of Binghamton, Broome county, New York, have made a certain new and useful Invention Relating to Phonograph-Stop Devices, of which the following is a specification, taken in connection with the accompanying drawing, which forms part of the same.

This invention relates especially to phonograph stop devices adapted to coöperate with the usual disk phonographs and comprising a brake lever coöperating with the turntable of the machine and having an actuating spring normally holding a projecting catch on said brake arm in contact with a latch arm which may also be pivoted beneath the turntable and having a part projecting therefrom so as to coöperate with and be actuated by the usual tone arm of the phonograph. An adjuster may be used in connection with the latch arm to regulate the part of the record at which the stop device operates and if desired, a contact arm may be used in connection with the adjuster so as to be engaged by the tone arm and operate the brake by releasing the latch.

Figure 1:
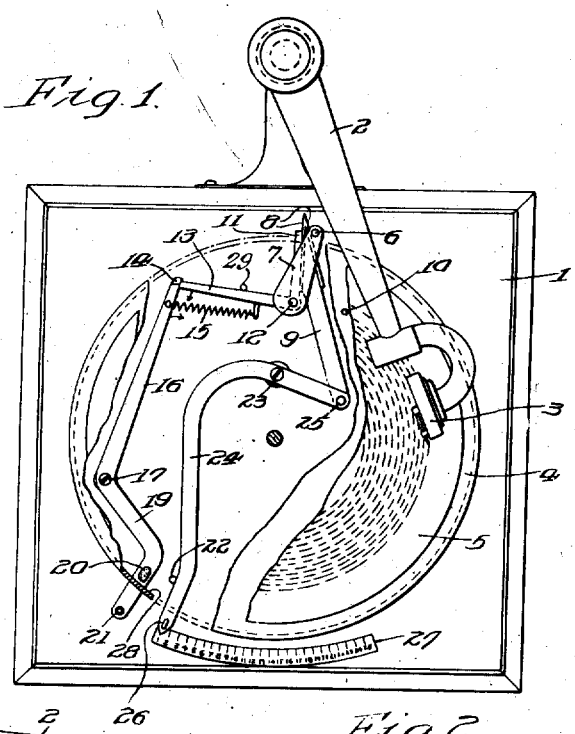
Figure 2:
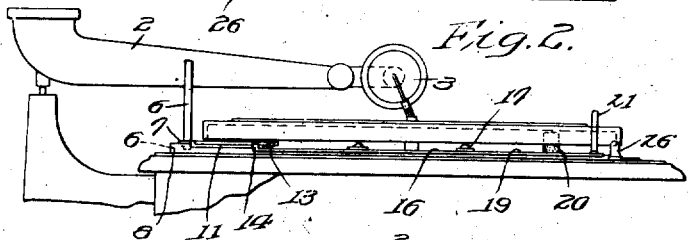
Figure 3:
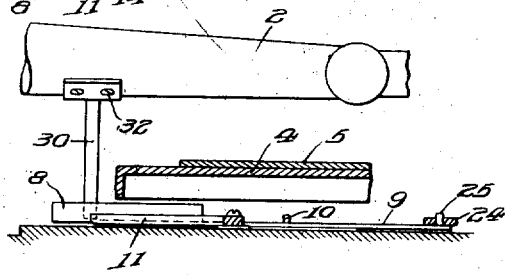

In the accompanying drawing showing two illustrative embodiments of this invention, Figure 1 is a plan view, parts being broken away. Fig. 2 is a side elevation, and Fig. 3 is an enlarged elevation showing a modified form of the device.

In the embodiment of the invention shown in Figs. 1 and 2 the top 1 of the motor casing may be of any usual construction and the rotating turntable 4 may be mounted above the same in the usual way so as to properly support the phonograph record disk 5. The brake lever 19 may be conveniently pivoted beneath the turntable by securing it by the pivot screw or pin 17 in the top so as to bring the brake 20, of leather or other suitable material, into coöperation with any convenient part of the phonograph mechanism, such as the depending edge flange 28 of the turntable. The brake may have a suitable actuating spring 15 which may be conveniently connected to the brake arm 16 and to a coöperating latch 13 which may be and preferably is conveniently pivoted about the pivot screw 12 beneath the turntable, suitable metallic washers being used, if desired, below these pivoted parts and also, in some cases, above them. By arranging this actuating spring substantially in line with the latch it normally holds the same in contact with the latch pin 29 so as to bring the end of this latch into engagement with any suitable portion of the brake arm such for instance as the upwardly projecting catch 14 adjacent the end of the same. In this way the spring powerfully actuates the brake so as to bring the turntable to rest after a partial revolution which serves to gradually absorb its momentum while at the same time this spring interposes little resistance to the movement of the latch arm away from the catch during this tripping or stopping action. The latch arm 11 is preferably extended so as to project somewhat beyond the turntable and be actuated from the usual tone arm 2 which is swung over the record by the needle attached to the sound box 3 in any usual way.

If desired the stop device may comprise a suitable adjuster coöperating with the latch arm in such way as to regulate the part of the record at which the stop device is actuated and thus make the device adaptable to records in which the sound groove extends inward to varying distances as is usual. For this purpose the adjuster 9 may, if desired, be provided with a wedge shaped end coöperating with the latch arm and preferably having flat edges of about the height of the latch arm, these edges being conveniently formed by stamping or bending up the edge portions of a flat piece of metal. This adjuster may be connected by the pivot 25 to the adjusting lever 24 which may be mounted so as to swing about the pivot screw 23 beneath the turntable and have its indicator and handle 26 coöperate with a suitable graduated scale 27 located at a convenient distance beyond the edge of the turntable and preferably on the opposite side of the axis of the turntable from the adjusting lever pivot 23 so that the lever end moves substantially symmetrically over this scale. A stop pin 22 may be used to limit the movement of the adjusting lever and a suitable stop pin 10 may be used to prevent the adjuster from moving away from the latch arm to an undesirable extent.

If desired a suitable contact arm 7 may be mounted in any desired way for coöperation with the tone arm and the other parts to be actuated therefrom, and this contact arm may if desired, be pivoted about the pivot screw 12 of the latch and be provided with a contact piece 6 projecting upward into the path of the tone arm itself so as to disengage the latch by swinging the latch arm and interposed adjuster over when the tone arm engages the contact piece, the contact arm, of course, having in this case a suitable projection on the underside to engage the adjuster such for example as a short extension of the contact piece or rod 6. The contact arm preferably has a relatively broad pivotal portion coöperating with the flat latch so as to minimize twisting when the parts are actuated although a light pressure is sufficient to disengage the latch arm from the catch of the brake arm which thereupon swings the latch inward so as to relieve the contact piece from further pressure from the tone arm, the direction in which the parts move in stopping the turntable, being indicated by the arrows in Fig. 1. The device may be readily reset when the tone arm is swung out into the usual position and a new record applied to the turntable, by forcing the setting handle 21 inward which swings the brake arm 16 outward sufficiently to allow the latch to be swung upward by the actuating spring into contact with the latch pin 29 so that on releasing the setting handle the actuating spring draws the catch 14 against the latch 13 so as to disengageably hold these parts in the normal set positions shown in Fig. 1, the brake being thus released from contact with the turntable which thus begins to rotate in the usual way to play the record.

Since the sound grooves terminate at different distances from the centers of various records it is desirable to indicate on each record the location of the inner end of the sound groove at which point the stopping device should be actuated and for this purpose the records may be measured and marked to correspond with the designations on the scale 27 which may be arbitrary or indicate these radial distances according to any suitable scale. When such a record is placed upon the turntable the adjusting handle 26 is moved into alinement with the corresponding designation of the scale 27 and this moves the adjuster into such position that the contact piece is engaged by the inwardly swinging tone arm when the needle has reached the end portion of the sound groove. The stopping device is then actuated as described and the turntable and record are gradually brought to rest in such way as to avoid all undesirable strain on the needle or connected sound box. If desired the contact piece may be secured in any desired way to the tone arm itself in which case the contact arm may be omitted and the contact piece may directly engage the adjuster as is shown in Fig. 3. In the modification of the device therein indicated the contact arm 30 may be connected to the tone arm 2 by securing the plate on the end of the contact piece to the tone arm in any desired way such as by the screws 32. The contact arm is thus in the path of the adjuster 8 so as to engage the same when the tone arm is moved inward to the end of the sound groove so as to force the adjuster and coöperating contact arm 11 over sufficiently to stop the machine.

In the device as above described, the brake lever 19, the said handle 21, the brake arm 16 and the upwardly projecting catch 14 constitute a braking member coöperating with a retaining member comprising the latch 13 and the latch arm 11, said retaining member operating to hold the brake member in its inoperative position (*i. e.* with the brake 20 out of engagement with the turntable 4) in opposition to the action of the spring 15 which is so connected to the brake member as to exert substantially its entire spring action on the brake member to apply the brake 20 when the brake member is released from the latch of the retaining member.

The spring 15 is also attached to the retaining member and extends in a direction substantially radial to the pivot 12 of the retaining member so that it offers little resistance to the slight movement of the retaining member as it moves to bring the end of the latch 13 out of operative engagement with the projecting catch 14 of the brake member. Thus the same single spring 15 connecting the brake member and the retaining member is operative to apply substantially its full force and effect to the brake member in applying the brake to the turntable, tends to turn the retaining member on its pivot and holds it yieldingly against its stop 29. It exerts only a slight resistance to the turning of said retaining member, and, therefore, permits the said retaining member to be swung out of its retaining position by a slight pressure against it exerted by the tone arm 2. The single spring 15 performs the double function of holding the braking member and the holding retaining member each under appropriate tension and this simplifies the construction of the device, avoiding the use of a plurality of different springs for the independent operation or actuation of the braking and retaining members, and reducing the cost of manufacturing the same.

The releasing member comprises the contact arm or lever 7 pivoted on the pivot screw 12, and contact piece 6, in the embodiment of the invention as shown in Figs. 1 and 2. In the form of my invention shown in Fig. 3, however, the releasing member may be said to comprise the arm 11, while the pin 30 may be considered as a part of the tone arm 2.

The wedge-shaped adjuster 8, the arm 9, the adjusting lever 24 and the indicator and handle 26 coöperating with the scale 27, constitute the setting or adjusting mechanism or member by means of which the device may be set to apply the brake at the end of a record groove irrespective of the distance between the end of said groove and the center of the record.

Having thus fully described my invention, I claim and desire to protect by Letters Patent of the United States:

1. In automatic stop devices, a top, a disk-turntable mounted above the same, an oscillating arm coöperating with said turntable and having its free end swinging substantially parallel to its flat face, a brake lever pivoted to said top and located beneath said turntable, a brake on said brake lever in position to coöperate with the depending edge flange of said turntable, a setting handle on said brake lever projecting beyond said turntable, a latch pivoted to said top and located beneath said turntable and having a latch arm projecting out from said turntable, an actuating spring connected between said brake lever and said latch and substantially in line with said latch, a latch pin against which said spring normally swings said latch to bring the same into engagement with said brake lever, a wedge shaped adjuster coöperating with said latch arm, a contact arm pivoted upon said latch and having a projecting contact piece in the path of said oscillating arm to enable said arm to disengage the said latch and stop the turntable, a curved adjusting lever pivoted beneath said turntable and connected to said adjuster to adjust the position of said contact arm with respect to said latch arm and an adjusting handle on said adjusting lever and a scale with which said adjusting lever coöperates and located beyond said turntable on the opposite side of the turntable axis from the pivot of said adjusting lever.

2. In automatic stop devices, a top, a turntable mounted above the same, an oscillating arm coöperating with said turntable, a brake lever pivoted to said top beneath said turntable, a brake on said brake lever in position to coöperate with said turntable, a setting handle on said brake lever projecting beyond said turntable, a catch on said brake lever, a latch pivoted to said top beneath said turntable and having a latch arm projecting out from said turntable, an actuating spring connected between said brake lever and said latch and substantially in line with said latch, a latch pin against which said spring normally swings said latch to bring the same into engagement with said catch on said brake lever, an adjuster coöperating with said latch arm, a contact arm pivoted upon said latch and having a contact piece in the path of said oscillating arm to enable said arm to disengage the said latch and stop the turntable, an adjusting lever pivoted beneath said turntable and connected to said adjuster to adjust the position of said contact arm with respect to said latch arm and an adjusting handle on said adjusting lever coöperating with a scale beyond said turntable.

3. In automatic stop devices, a top, a turntable mounted above the same, an oscillating arm coöperating with said turntable, a brake lever pivoted to said top beneath said turntable, a brake on said brake lever in position to coöperate with said turntable, a setting handle on said brake lever projecting beyond said turntable, a catch on said brake lever, a pivoted latch pivoted to said top beneath said turntable and having a latch arm projecting out from said turntable, an actuating spring connected between said brake lever and said latch and substantially in line with said latch, a latch pin against which said spring normally swings said latch to bring the same into engagement with said catch on said brake lever, an adjuster coöperating with said latch arm, a contact piece coöperating with said oscillating arm and with said latch arm to enable said oscillating arm to disengage the said latch and stop the turntable, an adjusting lever pivoted beneath said turntable and connected to said adjuster to regulate the action of said contact piece and an adjusting handle on said adjusting lever extending beyond said turntable.

4. In automatic stop devices, a turntable, an oscillating arm coöperating with said turntable, a brake member mounted beneath said turntable, a brake on said brake member in position to coöperate with said turntable, a setting handle on said brake member and projecting beyond said turntable, a latch pivoted beneath said turntable and having a latch arm projecting beyond said turntable, an adjuster coöperating with said latch arm, a contact piece coöperating with said oscillating arm and with said latch to enable said arm to disengage said latch and stop the turntable, an adjusting member mounted beneath said turntable and connected to said adjuster to regulate the action of said contact piece and an adjusting handle on said adjusting member extending beyond said turntable and moving substantially concentrically therewith.

5. In automatic stop devices, a pivoted brake lever adapted to be arranged beneath a turntable, a brake on said brake lever in position to coöperate with the depending edge flange of said turntable, a setting handle connected to said brake lever, an upwardly extending catch on the inner arm of said brake lever, a pivoted latch adapted to be mounted beneath said turntable and having a latch arm, an actuating spring connected between said brake lever and said latch and substantially in line with said latch, a latch pin against which said spring normally swings said latch to bring the same into engagement with said catch on said brake lever, a wedge shaped adjuster cooperating with said latch arm, a contact arm pivoted upon said latch and having a contact piece adapted to extend into the path of the oscillating arm coöperating with said turntable to enable said arm to disengage the said latch and stop the turntable, an adjusting member connected to said adjuster to regulate the action of said contact piece and an adjusting handle on said adjusting member adapted to extend beyond said turntable.

6. In automatic stop devices, a pivoted brake lever adapted to be arranged beneath a turntable, a brake on said brake lever in position to coöperate with said turntable, a setting handle connected to said brake lever, a catch on said brake lever, a pivoted latch adapted to be mounted beneath said turntable and having a latch arm, an actuating spring connected between said brake lever and said latch and substantially in line with said latch, a latch pin against which said spring normally swings said latch to bring the same into engagement with said catch on said brake lever, an adjuster coöperating with said latch arm, a contact arm pivoted upon said latch and having a contact piece adapted to extend into the path of the oscillating arm coöperating with the turntable to enable said arm to disengage the said latch and stop the turntable, an adjusting member connected to said adjuster to regulate the action of said contact piece and an adjusting handle on said adjusting member adapted to extend beyond said turntable.

7. In automatic stop devices, a pivoted brake lever adapted to be arranged beneath a turntable, a brake on said brake lever in position to coöperate with said turntable, a setting handle connected to said brake lever, a catch on said brake lever, a pivoted latch adapted to be mounted beneath said turntable and having a latch arm, an adjuster coöperating with said latch arm, a contact arm pivoted upon said latch and having a contact piece adapted to extend into the path of the oscillating arm coöperating with said turntable to enable said arm to disengage the said latch and stop the turntable, an adjusting member connected to said adjuster to regulate the action of said contact piece and an adjusting handle on said adjusting member adapted to extend beyond said turntable.

8. An automatic stop device comprising a pivoted brake member adapted to be arranged beneath a turntable, a brake on said brake lever in position to coöperate with said turntable, a pivoted retaining member adapted to be mounted beneath said turntable, yielding means connecting said brake member and retaining member tending to move the same with respect to each other, said retaining member adapted to be released to operate said brake.

9. An automatic brake comprising a brake member mounted to oscillate about a fixed axis, a retaining member mounted to oscillate about a fixed axis and arranged to hold said brake member in an inoperative position, yielding means connecting said members, and a releasing member mounted to oscillate coaxially with said retaining member, said releasing member and said retaining member being positioned in a predetermined relationship during the automatic operation of said brake, and said releasing member being rotatably adjustable with respect to said retaining member.

10. In automatic stop devices, a pivoted brake lever adapted to be arranged beneath a turntable, a brake on said brake lever in position to coöperate with said turntable, a pivoted latch adapted to be mounted beneath said turntable, an adjuster coöperating with said latch, a contact arm pivoted on said latch adapted to extend into the path of the oscillating arm coöperating with said turntable to enable said arm to disengage said latch and stop the turntable, an adjusting member connected to said adjuster to regulate the action of said contact arm.

11. An automatic stop device including in combination with a turntable and an oscillating arm, a pivoted brake lever adapted to be arranged beneath said turntable, a brake on said brake lever in position to coöperate with said turntable, a pivoted latch adapted to be mounted beneath said turntable and to coöperate with said brake lever to hold the same in an inoperative position, a spring connecting said brake lever and said retaining member, a releasing member adjustable with respect to said latch and pivoted coaxially therewith, said releasing member being adapted to be engaged by said oscillating arm to disengage the latch.

12. A mechanism of the character described, including, in combination with a turntable and swinging tone arm, a brake member pivoted on a vertical axis beneath the turntable, a retaining member pivoted on a vertical axis and arranged to hold said brake member in an inoperative position, yielding means connecting said members, a releasing member pivoted coaxially with said retaining member and adapted to be engaged by said tone arm to release said retaining member.

In witness whereof, I have hereunto set my hand this 17th day of January, 1916.

DANIEL M. WINANS.

Witnesses:

ALSTIN B. MOULTON,
CLARENCE L. FRENCH.